United States Patent
Ono et al.

(10) Patent No.: US 6,695,015 B1
(45) Date of Patent: Feb. 24, 2004

(54) ULTRALOW EXPANSION BRAKE RUBBER HOSE AND ITS PRODUCTION METHOD

(75) Inventors: Shigeo Ono, Kaiseimachi (JP); Takashi Terashima, Kaiseimachi (JP)

(73) Assignee: Kabushiki Kaisha Meiji Gomu Kasei, Tokyo (JP)

( * ) Notice: Subject to any disclaimer, the term of this patent is extended or adjusted under 35 U.S.C. 154(b) by 0 days.

(21) Appl. No.: 09/926,259

(22) PCT Filed: Feb. 4, 2000

(86) PCT No.: PCT/JP00/00623

§ 371 (c)(1),
(2), (4) Date: Oct. 2, 2001

(87) PCT Pub. No.: WO01/48412

PCT Pub. Date: Jul. 5, 2001

(51) Int. Cl.[7] ................................................. F16L 11/08
(52) U.S. Cl. ........................ 138/126; 138/125; 138/124; 138/DIG. 7
(58) Field of Search ................. 138/123–126, 138/DIG. 7; 156/143, 149

(56) References Cited

U.S. PATENT DOCUMENTS

| | | | | |
|---|---|---|---|---|
| 3,982,982 A | * | 9/1976 | Chudgar | 156/143 |
| 3,988,189 A | * | 10/1976 | Sullivan | 156/143 |
| 4,158,586 A | * | 6/1979 | Usui | 156/175 |
| 4,289,555 A | * | 9/1981 | Haren et al. | 156/149 |
| 4,306,591 A | * | 12/1981 | Arterburn | 138/125 |
| 4,397,337 A | * | 8/1983 | Porrmann et al. | 138/118.1 |
| 5,330,595 A | * | 7/1994 | Held | 156/64 |
| 5,655,572 A | * | 8/1997 | Marena | 138/125 |
| 5,836,715 A | * | 11/1998 | Hendrix et al. | 404/134 |
| 6,179,008 B1 | * | 1/2001 | Kawazura et al. | 138/125 |
| 6,257,280 B1 | * | 7/2001 | Marena | 138/125 |
| 6,302,150 B1 | * | 10/2001 | Martucci et al. | 138/125 |

* cited by examiner

*Primary Examiner*—Patrick Brinson
(74) *Attorney, Agent, or Firm*—Rader, Fishman & Grauer PLLC

(57) ABSTRACT

An ultralow expansion brake rubber hose comprising an inner rubber tube, a first reinforcing layer, a second reinforcing layer and an outer rubber layer, wherein a thermosetting resin which penetrates the reinforcing fibers constituting the first reinforcing layer and which is cured at vulcanizing temperatures is cured by vulcanization to turn the first reinforcing layer into a solid cured layer. By turning the first reinforcing layer into the solid cured layer, the mutual slippage between the reinforcing fibers of the first reinforcing layer can be prevented, and a brake rubber hose having low expansion and excellent durability can be obtained. The rubber hose can be produced by carrying out the continuous steps of braiding a first reinforcing layer around an inner rubber tube, immersing the first reinforcing layer in a thermosetting resin solution capable of penetrating the reinforcing fibers constituting the first reinforcing layer and having low viscosity to cause the thermosetting resin solution to penetrate the reinforcing fibers, braiding a second reinforcing layer, and extruding an outer rubber tube on the external surface of the second reinforcing layer.

3 Claims, 1 Drawing Sheet

ULTRALOW EXPANSION BRAKE RUBBER HOSE AND ITS PRODUCTION METHOD

TECHNICAL FIELD

The present invention relates to a brake rubber hose used in the brake of an automobile. More specifically, it relates to an ultralow expansion brake rubber hose having extremely low expansion at an initial pressure and production method thereof.

BACKGROUND ART

In the hydraulic brake of an automobile, the force exerted on a brake pedal is converted into a fluid pressure by a master cylinder, and the fluid pressure is carried to each wheel cylinder through a brake rubber hose. A conventional brake rubber hose comprises a rubber tube and a reinforcing layer formed by braiding. FIG. 3 is a perspective view of the brake rubber hose with portions thereof cut out. The brake rubber hose comprises an inner rubber tube 1 made of brake fluid-resistant ethylene-propylene-diene rubber (EPDM) or styrene-butadiene rubber (SBR), a first reinforcing layer 2 formed by braiding vinylon fibers as reinforcing fibers, an intermediate rubber layer 3 made of natural rubber (NR), EPDM or butyl rubber (IIR), a second reinforcing layer 4 formed by braiding vinylon fibers, and an outer rubber tube 5 made of EPDM or chloroprene rubber (CR).

A method for producing the brake rubber hose having the above constitution is as follows. Firstly, the inner rubber tube 1 is extruded around the perimeter of a long resin mandrel, and the first reinforcing layer 2 is braided on the external surface of the inner rubber tube 1. Then, the intermediate rubber layer 3 is extruded on the external surface of the first reinforcing layer 2 by an extruder or formed by winding a long rubber tape around the layer 2. When the layer 3 is formed by winding the rubber tape around the layer 2, the second reinforcing layer 4 is braded on the tape while the tape is wound around the layer 2. Then, the outer rubber tube 5 is extruded around the perimeter of the second reinforcing layer 4. These rubber tubes are vulcanized together with the long mandrel. After vulcanization, the long mandrel is taken out by use of hydraulic pressure. Thereafter, the long rubber hose is cut to a predetermined length and used.

In recent years, along with the advance of engine technology, road conditions are improved, the speed of a vehicle is increased, whereby further attention is paid to the performance of a brake and the performance of the brake is required to meet strict standards. Particularly, a braking capability and a feeling of braking are required to meet strict standards. Within a range of pressures exerted on the brake rubber hose, low pressures of 0 to 2.94 MPa are related to the feeling of braking. The reason why the internal volume of the hose is expanded at such low pressures is assumed to be not because the fibers constituting the reinforcing fiber layers in the structure of the hose extend elastically, but because the braided reinforcing fibers slip against each other. It is also assumed that the looseness in the braided fibers has a serious effect on the expansion of the internal volume.

Particularly, the expansion of the internal volume is controlled by the first reinforcing layer 2. Thus, to prevent the slippage between the braided reinforcing fibers, a method has heretofore been employed that comprises bonding and fixing braided reinforcing fibers (vinylon fibers) on the external surface of the inner rubber tube 1 by an adhesive.

However, the method of bonding and fixing reinforcing fibers on the external surface of the inner rubber tube by an adhesive has the following problems. That is, as the adhesive, a rubber-based solution-type vulcanization adhesive is generally used. Since the rubber-based solution-type vulcanization adhesive contains a solvent, it must be dried for a given time period after applied to the inner rubber tube 1. For this reason, the first reinforcing layer 2 cannot be braided immediately and continuously after the rubber-based solution-type vulcanization adhesive is applied to the inner rubber tube 1.

Further, although the reinforcing fibers are bonded to the inner rubber tube, the reinforcing fibers themselves are not always bonded to each other. For this reason, the reinforcing fibers of the first reinforcing layer 2 are displaced with the inner rubber tube 1 while stuck on the inner rubber tube, so that the mutual slippage between the reinforcing fibers of the first reinforcing layer 2 cannot be prevented completely. Therefore, a brake rubber hose having small expansion cannot be obtained by simply bonding the reinforcing fibers of the first reinforcing layer 2 to the inner rubber tube.

The present invention has been invented under the above present circumstances. It is an object of the present invention to provide the following target brake rubber hose and production method thereof.

It is an object of the present invention to provide a brake rubber hose which is completely free of the mutual slippage between the reinforcing fibers of the first reinforcing layer, and production method thereof.

It is another object of the present invention to provide an ultralow expansion brake rubber hose and production method thereof by preventing the mutual slippage between the reinforcing fibers of the first reinforcing layer completely.

DISCLOSURE OF THE INVENTION

To achieve the above objects, the present invention is constituted as follows. That is, the ultralow expansion brake rubber hose according to the present invention comprises an inner rubber tube, a first reinforcing layer, a second reinforcing layer and an outer rubber layer. The ultralow expansion brake rubber hose is characterized in that a thermosetting resin which is set at vulcanizing temperatures is caused to penetrate the reinforcing fibers constituting the first reinforcing layer and then cured by vulcanization to turn the first reinforcing layer into a solid cured layer.

The above inner rubber tube can be made of EPDM that a brake fluid can hardly penetrate, and the outer rubber layer can also be made of EPDM. As the reinforcing fibers constituting the first reinforcing layer and the second reinforcing layer, vinylon fibers can be used. As the thermosetting resin caused to penetrate the reinforcing fibers, a melamine resins or a phenol resin can be used.

Further, a method for producing the ultralow expansion brake rubber hose having the above constitution comprises the continuous steps of braiding the first reinforcing layer on the inner rubber tube, immersing the reinforcing fibers constituting the first reinforcing layer in a thermosetting resin solution capable of penetrating the reinforcing fibers and having low viscosity to cause the thermosetting resin solution to penetrate the reinforcing fibers, braiding the second reinforcing layer, and extruding the outer rubber tube on the external surface of the second reinforcing layer. In the step of causing the above thermosetting resin solution to penetrate the reinforcing fibers, a bath containing a thermosetting resin solution capable of penetrating the reinforcing fibers and having low viscosity is provided, and the reinforcing fibers are forcibly immersed in the bath to cause the thermosetting resin solution to penetrate the reinforcing fibers. Further, it is preferable to carry out the step of curing the inner rubber tube, the thermosetting resin and the outer rubber tube by vulcanization subsequently to the step of extruding the outer rubber tube.

In the present invention, since the first reinforcing internal layer is turned into a solid cured layer by causing the thermosetting resin to penetrate the reinforcing fibers of the first reinforcing layer and curing the thermosetting resin, the mutual slippage between the reinforcing fibers of the first reinforcing layer which controls the expansion of the internal volume when a pressure is applied can be prevented completely, and expansion can be held low. Therefore, a brake rubber hose which is excellent in a feeling of braking and durability can be obtained. When the thermosetting resin is applied only to the surface of the first reinforcing layer and cured after the first reinforcing layer is braided on the inner rubber tube, the thermosetting resin cannot fully penetrate the first reinforcing layer to reach the surface of the inner rubber tube and the coating resin layer is limited in thickness, so that the reinforcing fibers cannot be cured completely. Consequently, a mutual slippage occurs between the reinforcing fibers, and displacement between the reinforcing fibers when a pressure is applied cannot be prevented. The first reinforcing layer can be turned into a cured layer when the thermosetting resin penetrates the inside of the reinforcing fibers.

Further, since the external surface of the first reinforcing layer cured by the thermosetting resin has high abrasion resistance, an intermediate rubber layer for preventing abrasion between the first reinforcing layer and the second reinforcing layer is not needed. In addition, unlike the prior art, since a rubber-based solution-type vulcanization adhesive containing a solvent is not used, a production process in which the extrusion of the inner rubber tube and the braiding of the first reinforcing layer are performed continuously can be adopted, and such an environmental problem as air pollution caused by the evaporation of the solvent does not occur.

BEST MODE FOR CARRYING OUT THE INVENTION

Figure 1:
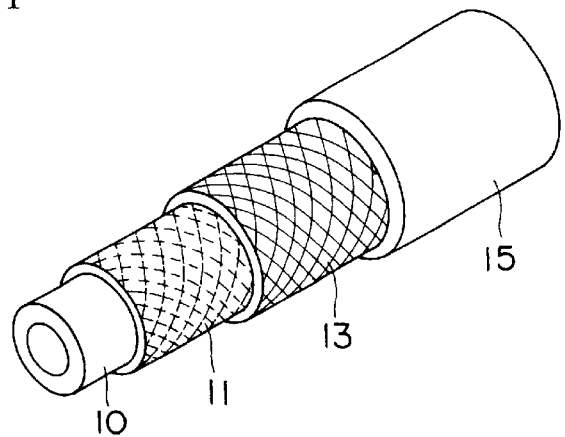
FIG. 1 is an exploded perspective view of the brake rubber hose according to the present invention.

The embodiment of the present invention will be described with reference to drawings hereinafter. In FIG. 1, reference numeral 10 denotes an inner rubber tube made of EPDM that a brake fluid hardly penetrates, 11 a first reinforcing layer formed by braiding vinylon fibers around the perimeter of the inner rubber tube 10, 13 a second reinforcing layer formed by braiding vinylon fibers around the perimeter of the above first reinforcing layer 11, and 15 an outer rubber tube made of EPDM and covering the second reinforcing layer 13. The reinforcing fibers constituting the above first reinforcing layer 11 are cured and unified by causing a melamine resin or a phenol resin, which is a thermosetting resin that is cured at vulcanizing temperatures, to penetrate the fibers.

That is, the above thermosetting resin not only covers the surface of the reinforcing fibers but also penetrates the insides of the reinforcing fibers to cure the reinforcing fibers themselves. Therefore, each of the reinforcing fibers constituting the above first reinforcing layer 11 is cured by the thermosetting resin penetrating the fiber, and the reinforcing fibers are unified and constitute a cured layer as a whole. The first reinforcing layer 11 is responsible for the withstandable pressure of the brake rubber hose, and the second reinforcing layer 13 only aids the first reinforcing layer 11. Therefore, it is sufficient to cure only the reinforcing fibers of the first reinforcing layer 11.

Figure 2:
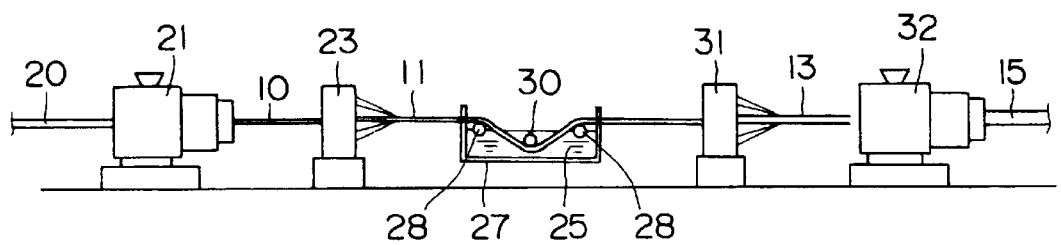
FIG. 2 is an illustrative drawing of the production method according to the present invention.
Figure 3:
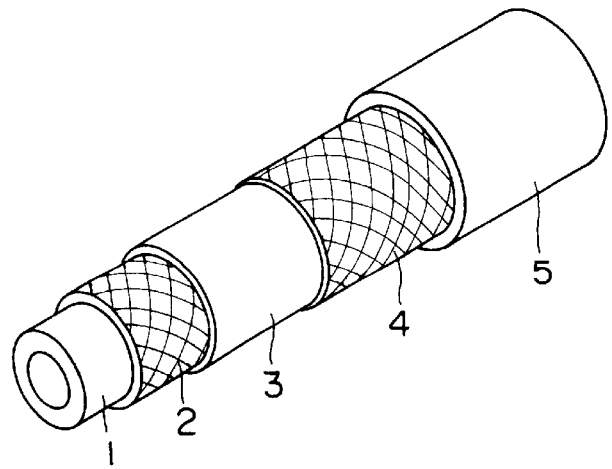
FIG. 3 is an exploded perspective view of the conventional brake rubber hose.

The brake rubber hose having the above constitution is produced in the following manner. As shown in FIG. 2, the inner rubber tube 10 is extruded around a long mandrel 20 by an extruder 21, and the first reinforcing layer 11 is braided on the external surface of the above inner rubber tube 10 by a braider 23. Then, the above inner rubber tube with the first reinforcing layer 11 braided therearound is immersed in a thermosetting resin solution 25 to allow the above thermosetting resin solution 25 to penetrate the reinforcing fibers. The viscosity of the above thermosetting resin solution 25 is adjusted to be so low that the thermosetting resin solution 25 can penetrate the reinforcing fibers. The inner rubber tube 10 with the first reinforcing layer 11 is forcibly immersed in the thermosetting resin solution 25 by the pressing rollers 28 and 30 provided in a resin solution bath 27 and penetrated by the thermosetting resin solution 25.

After the first reinforcing layer 11 is coated with and penetrated by the thermosetting resin solution, the second reinforcing layer 13 is braided by a braider 31, and then the outer rubber tube 15 is extruded by an extruder 32 so as to cover the second reinforcing layer 13. Thereafter, together with the inner rubber tube 10 and the outer rubber tube 15, the thermosetting resin solution penetrating the first reinforcing layer is vulcanized to be cured, as has conventionally been done.

The above production method is basically the same as the conventional production method in that the first reinforcing layer and the second reinforcing layer are formed and the outer rubber tube is extruded in the end. The above production method is different from the conventional production method in that after the step of braiding the first reinforcing layer 11, the step of applying the thermosetting resin solution to the first reinforcing layer and immersing the first reinforcing layer in the thermosetting resin solution is provided in place of the extrusion of an intermediate rubber layer which has conventionally been practiced and that the step of extruding the intermediate rubber layer is omitted.

EXAMPLES

Next, a description will be given to the specific examples of the present invention.

In Example, an inner rubber tube 10 having an internal diameter of 3.4 mm and an external diameter of 5.0 mm was produced by using EPDM. A first reinforcing layer 11 was braided by 2 fibers×20 carriers using a vinylon of 1,200 deniers. Thereafter, a melamine resin was caused to penetrate the layer 11, and the melamine resin penetrating the layer 11 was cured together with the rubber by vulcanization. A second reinforcing layer 13 was braded by 3 fibers×24 carriers using a vinylon of 1,200 deniers. An outer rubber tube 15 having an internal diameter of 8.0 mm and an external diameter of 10.4 mm was produced by using EPDM.

Meanwhile, the inner rubber tube, first reinforcing layer, second reinforcing layer and outer rubber tuber of Comparative Example have the same constitutions as those of Example. However, Comparative Example is different from Example in that a 0.25-mm-thick intermediate rubber layer made of natural rubber was formed between the first reinforcing layer and the second reinforcing layer as had conventionally been done and the first reinforcing layer was bonded to the external surface of the inner rubber tube.

The testing results of Example and Comparative Example are as follows.

The rubber hoses of the above Example and Comparative Example were tested for expansion and durability. The testing was conducted in accordance with JIS D2601. A whip test was carried out for testing durability. The testing results are as shown in Table 1.

TABLE 1

|  |  | Example | Comp. Example |
|---|---|---|---|
| Expansion of Hose (cc/m) | Pressure: 0.98 MPa | 0.04 | 0.10 |
|  | Pressure: 1.96 MPa | 0.09 | 0.13 |
|  | Pressure: 2.94 MPa | 0.11 | 0.16 |
| Whip Test |  | At Least 200 hrs | At Least 200 hrs |

As is clear from the above Table 1, the rubber hose of Example has smaller expansion than that of Comparative Example and is not inferior in durability to that of Comparative Example.

INDUSTRIAL APPLICABILITY

As described above, the ultralow expansion brake rubber hose according to the present invention and its production method are suitably used as a brake rubber hose for the hydraulic brake of an automobile which converts the force exerted on the brake pedal into a hydraulic pressure by a master cylinder.

What is claimed is:

1. An ultralow expansion brake rubber hose comprising an inner rubber tube, a first reinforcing layer, a second reinforcing layer and an outer rubber layer, wherein a thermosetting resin which is cured at a vulcanizing temperature is penetrated into the reinforcing fibers constituting the first reinforcing layer, and the penetrated resin is cured to turn the first reinforcing layer into a solid cured layer.

2. The hose of claim 1, wherein the thermosetting resin is a melamine resin.

3. The hose of claim 1, wherein the thermosetting resin is a phenol resin.

* * * * *